Figure 1:
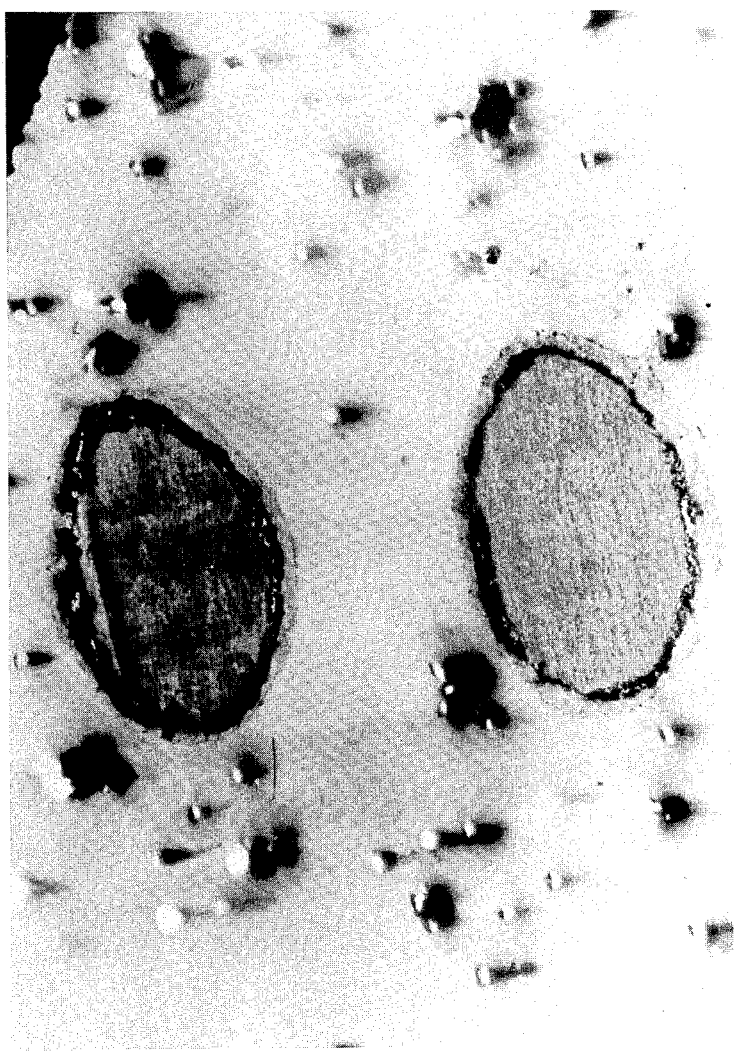

United States Patent [19]

Kasai et al.

[11] Patent Number: 4,828,955
[45] Date of Patent: May 9, 1989

[54] MICROENCAPSULATED PARTICLES AND PROCESS FOR PRODUCTION THEREOF

[75] Inventors: Kiyoshi Kasai, Kameyama; Masayuki Hattori, Aichi; Tatsuya Shimizu; Hiroshi Tadenuma, both of Yokkaichi, all of Japan

[73] Assignee: Japan Synthetic Rubber Co., Ltd., Tokyo, Japan

[21] Appl. No.: 110,267

[22] Filed: Oct. 20, 1987

[30] Foreign Application Priority Data

Oct. 27, 1986 [JP] Japan .................................. 61-255484
Apr. 9, 1987 [JP] Japan .................................. 62-87727
Apr. 13, 1987 [JP] Japan .................................. 62-90526

[51] Int. Cl.$^4$ ............................................. G03G 9/08
[52] U.S. Cl. .................................. 430/111; 430/137; 430/138; 428/402.24; 428/402.21
[58] Field of Search ........................ 430/111, 137, 138; 428/402.21, 402.24

[56] References Cited

U.S. PATENT DOCUMENTS 4,016,099 4/1977 Wellman ........................ 430/111 X Primary Examiner—J. David Welsh
Attorney, Agent, or Firm—Oblon, Fisher, Spivak, McClelland & Maier

[57] ABSTRACT

Microencapsulated particles each consisting of a mother particle of a core substance and a coating layer of daughter particles formed on the surface of said mother particle, which are obtained by stirring mother particles of a core substance having a number average particle diameter of 1 to 200 μm and either or both of daughter particles (1) of a coating layer-forming material having a number average particle diameter of 1/5 of less of that of the mother particles and fragile daughter particles (2) of a coating layer-forming material having a number average particle diameter of more than 1/5 of that of the mother particles but having a fragility index (Fr) as defined in the specification of 5 or more, at a high speed in an air stream. Said microencapsulated particles can be used in various application fields such as coatings, electronic components and electronograph. In the electronograph filed, in particular, the microencapsulated particles can effectively be used as a toner capable of providing an image of high resolution and good quality.

25 Claims, 1 Drawing Sheet

FIG. 1

MICROENCAPSULATED PARTICLES AND PROCESS FOR PRODUCTION THEREOF

This invention relates to microencapsulated particles and a process for producing the same. More particularly, this invention relates to microencapsulated particles each consisting of a fine particle of a core substance and a coating layer of a substance or substances of desired properties formed on the surface of the fine particle in order to modify said surface, and to a process for producing said microencapsulated particles. These microencapsulated particles can be used in various application fields such as coatings, papers, electronic components, electronographs, carriers for biochemical reactions, cosmetics, drugs, agricultural chemicals, foods and catalysts.

Known methods for modifying the surfaces of particles are, for example, a method of treating the surfaces of inorganic particles with a surfactant, a silane coupling agent, a titanium coupling agent or the like to improve the oleophilicity of said surfaces, and improve the dispersibility of said particles in oil phases, and a method of plating the surfaces of polymer particles with a metal to impart electroconductivity to the polymer particles. However, these methods have been disadvantageous in that they can achieve only a single purpose of imparting oleophilicity or electroconductivity to the surfaces of particles and, in the case of plating polymer particles with a metal, the metal is limited to Ni, Au, Cu, Sn, etc.

There has recently been proposed a method of utilizing a so-called mechanochemical effect to modify the surfaces of particles or to microencapsulate particles as a core substance [see Kagaku Sochi (Chemical Equipment), March, 1986, pages 27 to 33]. According to this method, to mother particles are electrostatically attached daughter particles having a certain particle diameter ratio to the particle diameter of mother particles, and they are strongly mixed in a ball mill or an automatic mortar to embed and fix the daughter particles in the mother particles, whereby the mother particles are modified at the surfaces or encapsulated as a core substance.

In the above method of surface modification or encapsulation of particles utilizing a mechanochemical effect, however, stirring of the mother particles and the daughter particles in the ball mill or the automatic mortar results in cracking of the mother particles or fusion between particles, thus making it difficult to form a uniform coating layer of the daughter particles on the surfaces of the mother particles. Further, the coating layer is formed only as a single particle layer of the daughter particles. Accordingly, it is impossible to coat the surfaces of the mother particles with a uniform and thick layer consisting of the daughter particles. In the above method, therefore, the coating layer formed has a low strength and the encapsulated particles do not have a practically sufficient strength. Moreover, the amount of the daughter particles not adhering to the mother particles is large and the presence of small particles due to such non-adhering daughter particles causes not only deterioration of product quality but also deterioration of powder fluidity, resulting in operational inconveniences.

The present inventors have made extensive research in order to solve the above problems. As a result, it has been found that the problems can easily be solved by stirring mother particles and daughter particles at a high speed in an air stream.

An object of this invention is to provide microencapsulated particles each consisting of a mother particle of a core substance and a coating layer of daughter particles formed on the surface of said mother particle.

Another object of this invention is to provide a process for producing the above microencapsulated particles.

Other objects and advantages will become apparent from the following description.

According to this invention, there are provided microencapsulated particles each consisting of a mother particles of a core substance and a coating layer of daughter particles of a coating-layer-forming material formed on the surface of said mother particle, which are obtained by stirring the mother particles having a number average particle diameter ($Sn$) of 1 to 200 μm and either or both of daughter particles (1) having a number average particle diameter of 1/5 or less of that of the mother particles and fragile daughter particles (2) having a number average particle diameter of more than 1/5 of that of the mother particles and having a fragility index ($Fr$) as defined herein of 5 or more, at a high speed in an air stream.

This invention further provides a process for producing microencapsulated particles, which comprises stirring mother particles of a core substance having a number average particle diameter ($Sn$) of 1 to 200 μm and either or both of daughter particles (1) having a number average particle diameter of 1/5 or less of that of the mother particles and fragile daughter particles (2) having a number average particle diameter of more than 1/5 of that of the mother particles and having a fragility index ($Fr$) as defined herein of 5 or more, both the daughter particles (1) and (2) being of coating-layer-forming materials, at a high speed in an air stream, thereby forming a coating layer of said daughter particles on each of said mother particles of a core substance.

The mother particles used in this invention have a number average particle diameter ($Sn$) of 1 to 200 μm, preferably 1 to 100 μm, and more preferably 2 to 50 μm. When the number average particle diameter ($Sn$) of the mother particles is less than 1 μm, the collision energy due to high speed stirring is insufficient and the formation of a coating layer thereon becomes difficult. In addition, cohesion of the mother particles to one another takes place and makes it difficult to form a coating layer on the individual mother particles. On the other hand, when the number average particle diameter of the mother particles exceeds 200 μm, they have no longer characteristics as fine particles.

The mother particles used in this invention may be any organic or inorganic substance as long as it satisfies the above requirements. The substance can appropriately be selected depending upon the application purpose of its final product, namely, microencapsulated particles. Typical examples of the organic substance include synthetic resins (i.e., synthetic polymers), and particularly, vinyl polymers are preferred. The vinyl monomers used for the production of the vinyl polymer may be, for example, aromatic vinyl compounds such as styrene, alpha-methylstyrene, halogenated styrenes, divinylbenzene; vinyl esters such as vinyl acetate, vinyl propionate and the like; unsaturated nitriles such as acrylonitrile and the like; and alkyl esters of the ethylenically unsaturated carboxylic acids such as methyl acrylate, ethyl acrylate, ethyl methacrylate, butyl acrylate, butyl methacrylate, 2-ethylhexyl acrylate, 2-ethylhexyl methacrylate, lauryl acrylate, lauryl methacrylate, ethylene glycol diacrylate, ethylene glycol dimethacrylate and the like. The vinyl polymer may be a homopolymer or copolymer of at least one monomer selected from the above vinyl monomers. The vinyl polymer may be a copolymer of at least one of the above vinyl monomers with a conjugated diolefin such as butadiene, isoprene or the like or with a monomer copolymerizable therewith such as acrylic acid, methacrylic acid, acrylamide, methacrylamide, glycidyl acrylate, glycidyl methacrylate, N-methylolacrylamide, N-methylolmethacrylamide, 2-hydroxyethyl acrylate, 2-hydroxyethyl methacrylate, diallyl phthalate, allyl acrylate, allyl methacrylate or the like.

The polymer particles having a number average particles diameter of a particular range in this invention can easily be produced by, for example, suspension-polymerizing the above vinyl monomer or grinding the bulk of the polymer.

When microencapsulated particles of uniform particle diameters are required, this purpose can be achieved by using mother particles of uniform particle diameters. Such mother particles can easily be produced according to the swell-polymerization method disclosed in Japanese Patent Publication No. 24,369/82, the polymerization method disclosed in J. Polym. Sci., Polymer Letter Ed., or the polymerization methods previously proposed by the present inventors in Japanese Patent Application Kokai (Laid-Open) Nos. 215,602/86, 215,603/86 and 215,604/86. When, for example, particles having a number average particle diameter (Sn) of 1 to 100 μm, preferably 1 to 25 μm and having such a particle diameter distribution that at least 70% by weight, preferably at least 80% by weight, more preferably at least 90% by weight of the whole of the particles have particle diameters falling within a range of 0.8Sn to 1.2Sn are used as the mother particles microencapsulated particles suited for use in applications requiring microencapsulated particles having substantially uniform particle diameters can be obtained.

As the mother particles of this invention, there can be used, in addition to the above polymer particles, particles of drug, agricultural chemical, food, perfume, dye, pigment, metal, etc. having a number average particle diameter of 1 to 200 μm.

When porous particles having absorbed thereinto or adsorbed thereon a liquid substance or solid substance powder are used as the mother particles, microencapsulated particles containing the liquid or solid substance in their interior. In this invention, the absorption or adsorption of the above substance implies the absorption, adsorption, adhesion or the like of the substance at the particle surfaces and inside the pores. This absorption or adsorption can be effected according to a known method, for example, impregnation or the like.

Incidentally, after the encapsulation of the porous mother particles, the liquid material may be absorbed into or adsorbed on the porous mother particles. In this case, however, the coating resulting from the encapsulation should not be too thick.

In this invention, the number average particle diameter and the particle diameter distribution of particles are determined by taking an electron micrograph of the particles and measuring at random and particle diameter of 100 particles on the electron micrograph. In the case of acicular particles such as dye particles, the average value of the larger diameter and the smaller diameter of a particle is taken as the diameter of the particle. In the case of amorphous particles such as wax particles, the average value of the maximum diameter and the minimum diameter of a particle is taken as the diameter of the particle.

The daughter particles of a coating layer-forming material used in this invention are (1) particles having a number average particle diameter of 1/5 or less, preferably 1/10 or less, more preferably 1/20 or less of that of the mother particles and (2) fragile particles having a number average particle diameter of more than 1/5 of that of the mother particles but having a fragility index (Fr) as defined herein of 5 or more. When the daughter particles have a number average particle diameter of more than 1/5 of that of the mother particles, it is generally impossible to form a uniform and sufficiently thick coating layer on the surfaces of the mother particles; however, even in that case, such a coating layer can be formed if the daughter particles have a fragility index (Fr) of 5 or more. There is no upper limit of the number average particle diameter of the fragile daughter particles (2) as long as the fragility index (Fr) of the particles is 5 or more; however, the upper limit is preferably 10 times the number average particle diameter of the mother particles in view of the facilitation of operation, the efficiency of high speed stirring, etc.

In this invention, the fragility index (Fr) is determined as follows:

100 g of a sample (particles) having a number average particle diameter of $Sn_0$ is introduced into a stirring apparatus equipped with agitating blades Hybridizer NHS-1 of K.K. Nara Kakai Seisakusho and subjected to high speed stirring at a blade peripheral speed of 50 m/sec for 5 minutes in an air stream; the resulting finer particles are measured for number average particle diameter (Sn); the fragility index (Fr) of the sample is calculated according to the following equation:

$Fr = Sn_0/Sn$

The kind of the daughter particles (1) used in this invention is not critical and can appropriately be selected from organic or inorganic substances, depending upon the purpose of the encapsulation of the mother particles. For example, when electroconductivity is imparted to the mother particles, the daughter particles (1) may be carbon black; powder of a metal such as Ni, Cu, Al, Fe or the like; powder of an inorganic material such as copper iodide, ruthenium oxide or the like; or electroconductive polymer particles such as polyacetylene, polythienylene or the like. When the mother particles have electroconductivity and are subjected to surface modification to increase their electric resistance and impart chargeability to them, the daughter particles (1) are preferably polymer particles, particularly, thermoplastic resin particles. Such thermoplastic resin particles can appropriately be selected from the previously mentioned vinyl polymers. It is preferred that the daughter particles (1) used in this invention have uniform particle diameters as the mother particles do.

When the purpose of the encapsulation of the mother particles is the coloring of the mother particles, the following pigments can be used as the coloring daughter particles (1).

Black pigments

Carbon black, acetylene black, lamp black, aniline black, magnetite

Yellow pigments

Chrome Yellow, zinc yellow, cadmium yellow, yellow iron oxide, Mineral Fast Yellow, nickel titanium yellow, naples yellow, Naphthol Yellow S, Hansa Yellow G, Hansa Yellow 10G, Benzidine Yellow G, Benzidine Yellow GR, Quinoline Yellow Lake, Permanent Yellow NCG, Tartrazine Lake

Brown Pigments

Chrome Orange, molybdenum orange, Permanent Orange GTR, Pyrazolone Orange, Vulcan Orange, Indanthrene Brilliant Orange RK, Benzidine Orange G, Indanthrene Brilliant Orange'GK

Red pigments

Red iron oxide, cadmium red, red lead, cadmium mercury sulfide, Permanent Red 4R, Lithol Red, Pyrazolone Red, Watchung Red Ca, Lake Red D, Brilliant Carmine 6B, Eosine Lake, Rhodamine Lake B, Alizarine Lake, Brilliant Carmine JB

Violet pigments

Manganese violet, Fast Violet B, Methyl Violet Lake

Blue pigments

Prussian blue, cobalt blue, Alkali Blue Lake, metal Phthalocyanine Blue, partial chlorination product of Phthalocyanine Blue, Fast Sky Blue, Indanthrene Blue BC

Green Pigments

Chrome Green, chromium oxide, Pigment Green B, Malachite Green Lake, Final Yellow Green

White Pigments

Zinc white, titanium oxide, antimony white, zinc sulfide

Extender Pigments

Barite powder, barium carbonate, clay, silica, white carbon, talc, alumina white When it is intended to control the chargeability of the mother particles, there can be used, as the daughter particles (1), various dyes such as Nigrosine, Methylene Blue, Rose Bengale, Quinoline Yellow, Ultra Blue and the like.

When it is intended to impart magnetism to the mother particles, Co, Fe, Ni, iron oxide and various ferrites can be used as the daughter particles (1).

Depending upon the application purpose of the microencapsulated particles of this invention, the daughter particles (1) of a coating layer-forming material may be of a functional material such as a fluorescent substance, hydroxyapatite, zirconia or the like.

The daughter particles (1) used may be of single substance or a combination of at least two substances. When a substance difficult to melt such as an inorganic substance is used as the daughter particles (1), it is preferable to mix the particles of the substance with the particles of a thermoplastic resin because the mixing provides easier formation of a coating layer. The mixed particles of at least two synthetic resins can also be used and, in this case, it is preferable that at least one of the synthetic resins is a thermoplastic resin.

When the daughter particles (1) consist of, for example, thermoplastic resin particles alone and it is desired to form a thick coating layer by a single encapsulation treatment, it is preferable to use the mixed particles consisting of at least two thermoplastic resins. The reason is believed to be as follows: When the daughter particles (1) consist of a single substance, the daughter particles cause electrostatical repulsion with one another on the surfaces of the mother particles, whereby no thick coating layer are formed, while when the daughter particles (1) consist of different substances, the electrostatical repulsion between the daughter particles (1) is lessened and consequently a thick coating layer can be formed. Further, when the daughter particles (1) consist of a substance or composition different from that constituting the surfaces of the mother particles, the adhesion of the daughter particles (1) onto the mother particles is made easy by the friction charging between the mother particles and the daughter particles (1), whereby a thick coating layer can be formed by a single encapsulation treatment and the amount of the daughter particles remaining unattached can be reduced.

It is also possible to repeat microencapsulation several times using daughter particles (1) consisting of a single substance or different substances, thereby to produce microencapsulated particles having a coating layer of multilayer structure. In this case, if the kind of the substance constituting the daughter particles (1) is altered in each microencapsulation step, the daughter particles (1) becomes easier to attach owing to the friction charging caused, whereby the formation of the coating layer becomes easier.

The fragile particles used as the daughter particles (2) of a coating layer-forming material in this invention have a fragility index (Fr) of 5 or more. If the daughter particles (2) have a Fr of less than 5, even if such daughter particles (2) and the mother particles have been stirred together at a high speed in an air stream, the particle diameters of the daughter particles (2) can not be reduced at all and accordingly no desired microencapsulation can be achieved.

The number average particle diameter of the daughter particles (2) after high speed stirring is 1/5 or less, preferably 1/10 or less, of that of the mother particles. Therefore, it is preferable to select the fragile daughter particles (2) of a coating layer-forming material so that the Fr and the number average particle diameter ($Sn_0$) thereof satisfy the above requirements.

Incidentally, the mother particles have preferably a Fr of about 1 to 2, more preferably 1 and it is preferred that the mother particles possess such a strengh that they are not broken down during their high speed stirring along with the daughter particles (1) and/or (2).

As the daughter particles (2) having a Fr of 5 or more, there can be used organic or inorganic pigments, dyes, etc. Examples of commercially available pigments usable as a coating layer-forming material include OIL COLORS, NIGROSIN, OPLAS COLORS, VALIFAST COLORS, BONTRON (there are products of Orient Kagaku Kogyo K.K.), ALZEN SPILON BLACK TRH (product of Hodogaya Chemical Co., Ltd.) and KAYASET COLORS (products of NIPPON KAYAKU CO., LTD.).

As the daughter particles (2), there can also be used natural waxes such as carnauba wax, spermaceti, insect was, montanic acid ester waxes, bees wax and the like; and synthetic waxes such as fatty acid amides, methylolstearamide, methylenebisstearamide, methylenebisoleamide, stearyl alcohol, cetyl alcohol, distearyl epoxyhexahydrophthalate, alpha-olefin oxides, low molecular weight polyolefins, n-paraffins, polywaxes (block copolymers of styrene), a polyolefin block-copolymerized with or graft-copolymerized on an alpha-methylene fatty acid monocarboxylic acid ester monomer, and the like.

The fragile daughter particles (2) of a coating layer-forming material may be used alone or in admixture of two or more. If necessary, a mixture of at least one type of fragile particles (2) with at least one type of the daughter particles (1) can also be used.

When the purpose of the microencapsulation of the mother particles is the coloring of the mother particles, the fragile daughter particles (2) can be used together with the pigments previously mentioned as the coloring daughter particles (1).

When it is intended to impart magnetism to the mother particles, the daughter particles (2) can be used together with the daughter particles (1) selected from Co, Fe, Ni, iron oxide and various ferrites.

Depending upon the application purpose of the mother particles, the daughter particles (2) can also be used together with various functional materials as the daughter particles (1), such as a fluorescent substance, hydroxyapatite, xanthone, zirconia or the like.

The daughter particles (1) to be co-used together with the daughter particles (2) may be of thermoplastic resins, and the fragile daughter particles (2) can be used in combination with particles of at least one thermoplastic resin. Preferred as the thermoplastic resin is a vinyl polymer as previously mentioned as an example of the mother particles.

The microencapsulated particles of this invention include even those microencapsulated particles having a coating layer of multilayer structure obtained by effecting one encapsulation with the daughter particles (2) and the repeating at least one encapsulation with at least one type of the daughter particles (1).

When as the daughter particles (1) to be co-used, a substance difficult to melt such as an inorganic substance is used, it is preferable to mix the particles of the inorganic substance with the particles of a thermoplastic resin because the formation of a coating layer is made easier. The mixed particles of at least two synthetic resins can also be used and, in this case, at least one of the synthetic resins is preferably a thermoplastic polymer.

When the diameter particles (1) to be co-used consist of only thermoplastic resin particles and it is desired to form a thick coating layer by a single encapsulation treatment, it is preferable to use mixed particles of at least two thermoplastic resins. This is considered to be because when the daughter particles (1) consist of a single substance, the particles cause electrostatical repulsion with one another on the surfaces of the mother particles, whereby no thick coating layer can be formed, while when the daughter particles (1) consist of different substances, the electrostatical repulsion between the daughter particles (1) is lessened. Further, when the daughter particles (1) to be co-used consist of a substance different from that constituting the surfaces of the mother particles, the attachment of the daughter particles to the mother particles is made easy by the friction charging between the mother particles and the daughter particles, whereby a thick coating layer can be formed by a single encapsulation treatment and the amount of the daughter particles remaining unattached can be reduced. Changing the type of the daughter particles (1) to be co-used facilitates the attachment of the daughter particles to the mother particles by friction charging, whereby the formation of a coating layer becomes easier.

The formation of a coating layer of the daughter particles (1) and/or (2) on the mother particles according to the process of this invention can be achieved by first mixing the mother particles with the daughter particles (1) and/or (2) and then, stirring the mixture at a high speed in a container provided with agitating blades in an air stream. This high speed stirring allows the particles to collide with one another or with the agitating blades or the container inner wall, and as a result, a local impact energy is generated on the particle surfaces and this energy allows the surfaces of the mother particles to melt or allows the daughter particles to melt or be elongated, whereby a coating layer of the daughter particles is formed on the surfaces of the mother particles and the microcapsulation is finished.

As above, in the process of this invention, the mother particles and the daughter particles are stirred at a high speed in an air stream. This stirring in an air stream prevents the mother particles from being fused and enables a uniform coating layer to be formed on each of the mother particles. Stirring in a ball mill or an automatic mortar used in the conventional processes is not desirable because the proportion of the particles fused becomes great.

The peripheral speed of the agitating blades in the process of this invention is 15 m/sec or more, preferably 30 m/sec or more, and more preferably 40 to 150 m/sec. When the peripheral speed is less than 15 m/sec, the necessary energy for the formation of a coating layer cannot be obtained. The peripheral speed has no upper limit but it is inherently determined from equipment used and energy efficiency.

In the process of this invention, when the mother particles and the daughter particles (1) and/or (2) are placed in the blade-equipped container in large amounts and stirred at a high speed, the collision between these particles or the collision of these particles with the blades or the container inner wall takes place excessively and, as a result, the formation of a desired coating layer becomes impossible or the high speed stirring becomes difficult. Hence, it is advisable that the mother particles and the daughter particles (1) and/or (2) be used in such a concentration that the total weight of the mother particles and the daughter particles becomes 10 to 100 g, preferably 20 to 70 g, per liter of the inner volume of the blade-equipped container. When it is less than 10 g, the frequency of the collision between the particles is too small to obtain the energy necessary for forming the coating layer. When it is more than 100 g, the fusion between the mother particles is caused, and no microencapsulated particles having a uniform particle diameter can be obtained and the particles are attached to the inner wall of the equipment.

With respect to the proportions of the mother particles and the daughter particles (1) and/or (2), it is advisable that the daughter particles (1) and/or (2) be used in an amount of 1 to 100 parts by weight, preferably 5 to 50 parts by weight, per 100 parts by weight of the mother particles. When the amount of the daughter particles (1) and/or (2) is less than 1 part by weight, the formation of a coating layer is insufficient. When the amount exceeds 100 parts by weight, the fusion between the daughter particles tends to take place.

One of the main application of the microencapsulated particles of this invention is a toner for electronograph. In the production of this toner, it is preferable to use, as the mother particles of the microencapsulated particles, particles of polymer, usually selected from vinyl polymers, having a number average particle diameter (Sn) of 1 to 30 μm, preferably 1 to 15 μm, and having such a particle diameter distribution that at least 70% by weight, preferably at least 80% by weight, more preferably 90% by weight, of the total particles have particle diameters falling within a range of 0.8Sn to 1.2Sn; and use, as the daughter particles of the microencapsulated particles, a mixture of 1 part by weight of particles of one of the previously mentioned pigments and 0.1 to 100 parts by weight, preferably 0.3 to 10 parts by weight, of particles of a thermoplastic resin. Use of such mixed particles consisting of pigment particles and thermoplastic resin particles enables a pigment-containing uniform coating layer to be formed on each of the mother particles. If necessary, it is also possible to use the thus obtained microencapsulated particles as mother particles and form thereon another coating layer consisting of other polymer particles. It is furthermore possible to use, as part of the daughter particles, a so-called charge-controlling agent such as Nigrosine, a chromium-containing dye or the like, or fine particles of a wax (e.g., a polyethylene wax, a polypropylene wax or the like) to control the performance of the toner to be produced.

This invention will be explained in more detail below referred to Examples and the accompanying drawing, which are merely by way of illustration and not by way of limitation. In the accompanying drawing, FIG. 1 is an enlarged photograph (magnification: 7500) of sections of the microencapsulated particles having a coating layer of multilayer structure obtained in Example 3.

EXAMPLE 1

Crosslinked polystyrene particles having a monomer composition of styrene/divinylbenzene=70/30 were produced in accordance with the method disclosed in Japanese Patent Publication No. 24,369/82. The above particles had a number average particle diameter of 9.3 μm and such a particle diameter distribution that 98% by weight of the total particles had particle diameters falling within a range of 7.5 to 11.1 μm (the standard deviation of the particle diameters was 4% of the number average particle diameter) and accordingly had highly uniform particle diameters.

These particles were water-washed and dried. 80 g of the resulting particles were used as mother particles. These mother particles were mixed with 10 g of Carbon Black #40 (product of Mitsubishi Chemical Industries, Ltd.) having a number average particle diameter of about 0.02 μm and 10 g of a polymethyl methacrylate powder (MP-1451, product of Soken Kagaku, K.K.) having a number average particle diameter of 0.15 μm (both as the daughter particles (1) of coating layer-forming materials). The mixture was placed in Hybridizer NHS-1 (product of K.K. Nara Kikai Seisakusho) having an internal volume of 4 liters and subjected to stirring at a blade peripheral speed of 78 m/sec at room temperature for 8 minutes, whereby a uniform coating layer consisting of the carbon black and the polymethyl methacrylate was formed on the surfaces of the mother particles and the mother particles were encapsulated. Incidentally, the temperature inside the hybridizer after stirring was about 80° C.

Part of the encapsulated particles obtained above was sandwiched between two slide glasses and rubbed, but the coating layer did not fall off from the core substance, from which it was seen that the coating layer adhered sufficiently. The microencapsulated particles were highly uniform particles having a number average particle diameter of 10.0 μm and had a low resistivity of $7 \times 10^3$ Ω·cm and accordingly could be used as an electroconductive black color spacer.

EXAMPLE 2

In the same menner as in Example 1, there were produced polymer particles having a monomer composition of styrene/butyl acrylate, a glass transition temperature of 50° C., a number average molecular weight of 16,000 and a weight average molecular weight of 46,000. These particles had a number average particle diameter of 7 μm and such a particle diameter distribution that 95% by weight of the total particles had particle diameters ranging from 5.6 to 8.4 μm (the standard deviation of the particle diameters was 5% of the number average particle diameter) and accordingly had highly uniform particle diameters.

The particles were water-washed and dried. 80 g of the resulting particles were used as mother particles. The mother particles were mixed with 10 g of Carbon Black MA 600 (product of Mitsubishi Chemical Industries, Ltd.) having a number average particle diameter of about 0.02 μm and 10 g of a polymethyl methacrylate powder (MP-1451, product of Soken Kagaku K.K.) having a number average particle diameter of 0.15 μm (both as the daughter particles (1) of coating layer-forming materials). The mixture was placed in Hybridizer NHS-1 and stirred at a blade peripheral speed of 84 m/sec at room temperature for 3 minutes, whereby a uniform coating layer consisting of the carbon black and the polymethyl methacrylate was formed on the surfaces of the mother particles. 92% by weight of the total microencapsulated particles had particle diameters of 6.1 to 9.1 μm. The amount of the smaller particles resulting from the polymethyl methacrylate particles, namely, the amount of the particles reamining unattached, was less than 0.5% by weight of the total weight of the particles.

EXAMPLE 3

The microencapsulated particles (polymer particles having a carbon-containing coating layer at the surfaces) having uniform particle diameters obtained in Example 2 were used as mother particles. 166 g of these mother particles were mixed with 34 g of a polystyrene powder having a number average particle diameter of 0.2 μm as daughter particles (1) of a coating layer-forming material. The mixture was placed in the same apparatus as used in Example 2 and stirred at a blade peripheral speed of 84 m/sec at room temperature for 4 minutes, to obtain microencapsulated particles each consisting of a mother particle having formed thereon a polystyrene coating layer. These microencapsulated particles had a number average particlediameter (Sn) of 8.1 μm and such a particle diameter distribution that 92% by weight of the total particles had particle diameters of 0.8Sn to 1.2Sn. The amount of the smaller particles resulting from the polystyrene particles and having particle diameters of 0.2 to 0.5 μm, namely, the amount of the particles remaining unattached, was 3% by weight of the total particles.

The microencapsulated particles had a polystyrene coating layer at the surfaces, so that their resistivity was as high as $2 \times 10^{16}$ Ω·cm. Thus, there was obtained a negatively chargeable toner whose charge amount was −22 μC/g.

With this toner, a copying test was conducted using a copying machine (FT-4045, product of RICOH CO., LTD.). No fogging was seen, the resolution was 10 lines/mm, and the gradation was good. A good image could be obtained even after a long run test of 30,000 sheets.

The enlarged photograph (magnification: 7500) of sections of the microencapsulated particles obtained above are shown in FIG. 1. As is clear from FIG. 1, each of the encapsulated particles consisted of a mother particle (innermost)/a carbon black-polymer coating layer (intermediate)/a polymer coating layer (outermost), namely, each had the mother particle as a core and had a coating layer of double layer structure formed thereon. In FIG. 1, the microencapsulated particles are slightly ellipsoidal owing to the force applied at the time of cutting, but they had nearly spherical before cutting.

EXAMPLE 4

Microencapsulated particles having a number average particle diameter of 7.6 μm each consisting of a mother particle having formed thereon a magnetitepolymethyl methacrylate coating layer were produced in the same manner as in Example 2, except that 60 g of magnetite (EPT 500, product of Toda Kogyo K.K.) having particle diameters ranging from 0.3 to 0.5 μm was used in place of the 10 g of the carbon black used in Example 2.

150 g of the above microencapsulated particles were used as mother particles and mixed with 18 g of a polystyrene powder having a number average particle diameter of 0.2 μm and 2 g of a Nigrosine dye (BONTRON N-07, product of Orient Kagaku Kogyo K.K.) which had previously been ground to a number average particle diameter of about 0.5 μm (both as daughter particles (1)). The mixture was placed in the same apparatus as used in Example 2 and stirred at a blade peripheral speed of 80 m/sec for 6 minutes, to obtain a positively chargeable magnetic toner having a high resistivity of $4 \times 10^{16}$ Ω·cm, whose charge amount was +8 μC/g. This toner was evaluated using a copying machine (PC-12, product of CANON INC.) No fogging was seen, the resolution was 10 lines/mm, and the gradation was good.

COMPARATIVE EXAMPLE 1

The same procedure as in Example 1 was repeated, except that a ball mill was used in place of the hybridizer used in Example 1 and the stirring time was 6 hours.

The resulting particles were observed under a scanning type electron microscope. A coating layer was formed but the mother particles were cracked and no spherical particles were obtained.

EXAMPLE 5

Microencapsulated particles were produced in the same manner as in Example 1, except that the carbon black used in Example 1 was replaced by 30 g of a nickel powder (Ni Fine Powder 2030, product of Mitsui Mining & Smelting Co., Ltd.) having a number average particle diameter of about 0.35 μm.

These microencapsulated particles were highly uniform particles having a number average particle diameter of 10.0 μm and had a resistivity of 0.15 Ω·cm.

EXAMPLE 6

Microencapsulated particles were produced in the same manner as in Example 3, except that the amount of the mother particles used was changed from 166 g to 100 g and mixed particles consisting of 10 g of the same polystyrene powder as in Example 3 and 10 g of a styrenemethacrylic acid copolymer (weight ratio: 95:5) having a number average particle diameter of 0.15 μm were used as the daughter particles (1).

The above microencapsulated particles had a number average particle diameter (Sn) of 8.1 μm and such a particle diameter distribution that 95% by weight of the total particles had particle diameters ranging from 0.8Sn to 1.2Sn. The amount of the smaller particles having particle diameters of 1 μm or less resulting from the daughter particles, namely, the amount of the particles remaining unattached, was 0.1% by weight of the total particles.

The microencapsulated particles had a coating layer of the above thermoplastic resins at the surfaces, and hence, had a high resistivity of $5 \times 10^{16}$ Ω·cm, whose charge amount was −38 μC/g.

Using these microencapsulated particles as a toner, the same copying test as in Example 3 was conducted. No fogging was seen, the resolution was 10 lines/mm, and the gradation was good. A good image was obtained even after a long run test of 30,000 sheets.

EXAMPLE 7

Microencapsulation was conducted in the same manner as in Example 2, except that (a) the amount of the mother particles used was changed from 166 g to 120 g, (b) mixed particles consisting of 15 g of a red dye (OPLAS RED 330, product of Orient Kagaku K.K.) which had previously been ground to a number average particle diameter of 1 μm or less and 30 g of a styrene-butyl acrylate copolymer powder having a number average particle diameter of 0.15 μm were used as daughter particles (1), and (c) stirring was conducted at a blade peripheral speed of 75 m/sec for 5 minutes, to obtain particles of a red toner each consisting of a mother particle having formed thereon a coating layer of dye particles.

This red toner had a number average particle diameter of 7.8 μm and a resistivity of $1 \times 10^{16}$ Ω·cm, whose charge amount was −16 μC/g.

Using this red toner, the same copying test as in Example 3 was conducted. No fogging was seen and a red image was obtained at a resolution of 8 lines/mm.

EXAMPLE 8

As the mother particles, 400 g of an iron powder (EFV, product of Nihon Teppun K.K.) having a number average particle diameter of 70 μm was used. As the daughter particles (1), mixed particles consisting of 20 g of the same polystyrene powder as in Example 1 having a number average particle diameter of 0.3 μm and 20 g of the same polymethyl methacrylate powder as in Example 1 having a number average particle diameter of 0.25 μm were used. The mother particles and the daughter particles were placed in the same apparatus as in Example 1 and stirred at a blade peripheral speed of 45 m/sec for 15 minutes, to obtain microencapsulated particles, in each of which an iron particle was uniformly coated with the polymer particles.

These microencapsulated particles were used as a binary carrier for electronograph to obtain a developer having a long life.

EXAMPLE 9

Porous divinylbenzene particles having a number average particle diameter of 10 μm and a porosity (as calculated from the volume of pores having a pore size of 0.05 μm or less measured by a mercury pressure-filling type porosimeter) of 50% were impregnated with citronellal (manufactured by Wako Pure Chemical Industries, Ltd.). The thus impregnated porous particles were used as the mother particles. 110 g of these mother particles were mixed with mixed particles, as daughter particles (1), consisting of 20 g of the same polystyrene powder as in Example 1 having a number average particle diameter of 0.15 μm and 20 g of the same polymethyl methacrylate as in Example 1 having a number average particle diameter of 0.15 μm. The resulting mixture was placed in the same apparatus as in Example 1 and stirred at a blade peripheral speed of 80 m/sec for 10 minutes to obtain microencapsulated particles.

The above microencapsulated particles had a coating layer of sufficient strength and could be served as a slowly acting perfume for more than 2 months.

EXAMPLE 10

Microencapsulated particles were obtained in the same manner as in Example 2, except that the polymethyl methacrylate particles used in Example 2 were replaced by 10 g of the same type styrene/butyl acrylate copolymer (glass transition temperature of 50° C.) particles having a number average particle diameter of 0.13 μm as the mother particles in Example 2.

These microencapsulated particles had a number average particle diameter (Sn) of 7.2 μm and such a particle diameter distribution that 87% by weight of the total particles had particle diameters ranging from 0.8Sn to 1.2Sn. The amount of the smaller particles having particle diameters of 0.5 μm or less resulting from the daughter particles was 3.5% by weight of the total particles.

The microencapsulation of the mother particles was satisfactory; however, the amount of the particles remaining unattached was slightly larger because the daughter particles (1) and the mother particles were of the same type.

EXAMPLE 11

Microencapsulated particles were produced in the same manner as in Example 6, except that as daughter particles (1), 18 g of a polystyrene powder and 20 g of the same polymethyl methacrylate powder as in Example 2 were used.

The above microencapsulated particles had a number average particle diameter (Sn) of 8.4 μm and such a particle diameter distribution that 93% by weight of the total particles had particle diameters ranging from 0.8Sn to 1.2Sn. The amount of the smaller particles having particle diameters of 1 μm or less resulting from the daughter particles (1) was 0.5% by weight of the total particles.

It was found that even when the mother particles are thickly coated with mixed particles consisting of two types of coating layer-forming materials, the amount of particles of smaller particle diameters remaining unattached was small.

EXAMPLE 12

Polymer particles having a monomer composition of styrene/butyl acrylate=78/22 and a glass transition temperature of 55° C. were produced in accordance with the method disclosed in Japanese Patent Publication No. 24,369/82. The above polymer particles had a number average particle diameter of 9.3 μm and such a particle diameter distribution that 98% by weight of the total particles had particle diameters falling within a range of 7.5 to 11.1 μm (the standard deviation of the particle diameters was 4% of the number average particle diameter) and accordingly had highly uniform particle diameters. The polymer particles had a fragility index (Fr) of 1.0.

80 g of the above polymer particles were used as mother particles. The mother particles were mixed with 10 g of a red dye (OPLAS RED, product of Orient Kagaku, K.K.) having a number average particle diameter of 88 μm and a fragility of 450 as daughter particles (2) and 20 g of a styrene/butyl acrylate copolymer powder having a number average particle diameter of 0.15 μm as daughter particles (1). The mixture was placed in Hybridizer NHS-1 (product of Nara Kikai Seisakusho K.K.) having an internal volume of 4 liters and subjected to stirring a blade peripheral speed of 78 m/sec at room temperature for 8 minutes, whereby a uniform coating layer consisting of the finely ground red dye and the styrene/butyl acrylate copolymer was formed on the surfaces of the mother particles.

The microencapsulated particles obtained above had a number average particle diameter of 10.3 μm, whose charge amount was −18 μC/g as measured according to the blow-off method.

Using the particles as a toner, a copying test was conducted by means of a copying machine (FT-4045, product of RICHO CO., LTD.). No fogging was seen, the resolution was 10 lines/mm, and the gradation was good. A good image was obtained even after a long run test of 30,000 sheets.

EXAMPLE 13

In the same manner as in Example 12, polymer particles having a monomer composition of styrene/2-ethylhexyl acrylate=82/12, a glass transition temperature of 46° C. and a number average particle diameter of 5.0 μm were prepared.

The above particles were water-washed and dried. 80 g of the resulting particles were used as mother particles. The mother particles were mixed with 10 g of Carbon Black MA 600 (product of Mitsubishi Chemical Industries, Ltd.) having a number average particle diameter of about 0.02 μm as daughter particles (1) and 10 g of a polymethyl methacrylate powder (MP-1451, product of Soken Kagaku K.K.) having a number average particle diameter of 0.15 μm as daughter particles (1). The resulting mixture was placed in Hybridizer NHS-1 and stirred at a blade peripheral speed of 84 m/sec at room temperature for 3 minutes, whereby a uniform coating layer consisting of the carbon black and the polymethyl methacrylate was formed on the surfaces of the mother particles.

The above microencapsulated particles had a number average particle diameter (Sn) of 5.4 μm and highly uniform particle diameters. The microencapsulated particles were used as mother particles. 100 g of the mother particles were mixed with 2 g of a pigment (BONTRON S-34, product of Orient Kagaku Kogyo, K.K.) having a number average particle diameter of 25 μm and a fragility index (Fr) of 70 as daughter particles (2) and 20 g of polystyrene powder having a number average particle diameter of 0.15 μm as daughter particles (1).

The resulting mixture was placed in the same hybridizer as in Example 1 and stirred at a blade peripheral speed of 90 m/sec at room temperature for 5 minutes, to obtain microencapsulated particles having a number average particle diameter of 5.7 μm, in each of which a carbon-coated polymer particle as a core was coated and encapsulated with the pigment (BONTRON S-34) and the polystyrene. The surface of each microencapsulated particle was smooth and no smaller particle remained unattached.

The surfaces of the microencapsulated particles had a high resistivity of $5 \times 10^{16}$ Ω·cm because of the coverage with polystyrene, and a negatively chargeable tonere whose charge amount was $-46$ μC/g was obtained.

Using the toner, a copying test was conducted by means of copying machine (FT-4045, product of RICOH CO., LTD.). No fogging was seen, the resolution was 10 lines/mm, and the gradation was good. A good image was obtained even after a long run test of 30,000 sheets.

EXAMPLE 14

In the same manner as in Example 12, polymer particles having a monomer composition of styrene/butyl methacrylate=80/20, a glass transition temperature of 60° C. and a number average particle diameter of 10.2 μm were prepared.

These polymer particles were water-washed and dried. 100 g of the resulting particles as mother particles were mixed 3 g of a Nigrosine pigment (BONTRON N-07, product of Orient Kagaku Kogyo K.K.) having a number average particle diameter of 38 μm and a fragility index (Fr) of 80 as daughter particles (2), 60 g of magnetite (EPT 500, product of Toda Kogyo K.K.) having particle diameters of 0.3 to 0.5 μm as daughter particles (1), and 20 g of a styrene/butyl acrylate copolymer powder having a number average particle diameter of 0.15 μm and a glass transition temperature of 60° C. as daughter particles (1). The resulting mixture was placed in the same hybridizer as used in Example 1 and stirred at a blade peripheral speed of 80 m/sec at room temperature for 10 minutes, to produce microencapsulated particles, in each of which a coating layer of the finely ground pigment (BONTRON N-07) and magnetite was formed on the mother particle as a core.

Thus, a magnetic toner whose charge amount was $+7$ μC/g was obtained. This toner was evaluated using a copying machine (PC-12, product of CANON INC.). No fogging was seen, the resolution was 10 lines/mm, and the gradation was good.

EXAMPLE 15

As mother particles, 400 g of an iron powder (EFV, product of Nihon Teppun K.K.) having a number average particle diameter of 70 μm was used, and as daughter particles (2), 20 g of a carnauba wax powder having a number average particle diameter of 2 μm and a fragility index of 2400 were used. They were mixed, placed in the same hybridizer as in Example 12 and stirred at a blade peripheral speed of 50 m/sec for 10 minutes, to obtain microencapsulated particles, in each of which the iron particle (core) was uniformly covered with the wax.

EXAMPLE 16

Porous divinylbenzene particles having a number average particle diameter of 10 μm and a porosity of 50% as calculated from the volume of the pores having pore diameters of 0.05 μm or less measured by a mercury pressure-filling type porosimeter were impregnated with citronellal manufactured by Wako Pure Chemical Industries, Ltd. at a weight ratio of 1:1. These impregnated porous particles were used as mother particles. 110 g of the mother particles were mixed with 40 g of a wax powder (Suntight S, product of Seiko Kagaku K.K.) having a number average particle diameter of 0.15 μm and a fragility index of 3500 as daughter particles (2). The resulting mixture was placed in the same hybridizer as in Example 12 and stirred at a blade peripheral speed of 80 m/sec for 10 minutes, to obtain microencapsulated particles each containing, as a core, a citronellal-impregnated divinylbenzene particle.

The above microencapsulated particles had a coating layer of a sufficient strength and could be used as a slowly acting perfume for more than 2 months.

COMPARATIVE EXAMPLE 2

Microencapsulation was conducted in the same manner as in Example 12, except that the red dye (OPLAS RED 330) was replaced by alpha-$Fe_2O_3$ having a number average particle diameter of 5.2 μm and a fragility index of 1 as daughter particles (2).

In the microencapsulated particles obtained, the polymer particles as mother particles and the red dye particles were present separately and the desired microencapsulation was not achieved.

COMPARATIVE EXAMPLE 3

Microencapsulation was conducted in the same manner as in Example 16, except that the wax (Suntight S) was replaced by polystyrene beads having a number average particle diameter of 30 μm and a fragility index (Fr) of 1 as daughter particles (2).

In the microencapsulated particles obtained, the porous divinylbenzene particles containing citronellal and the polystyrene beads were present separately and the desired microencapsulation was not achieved.

What is claimed is:

1. Microencapsulated particles each consisting of a mother particle of a core substance and a coating layer of a coating layer-forming material formed on the surface of said mother particle, which are obtained by stirring the mother particles of a core substance having a number average particle diameter of 1 to 200 μm and either or both of (1) daughter particles of a coating layer-forming material having a number average particle diameter of 1/5 or less of that of the mother particles and (2) fragile daughter particles of a coating layer-forming material having a number average particle diameter of more than 1/5 of that of the mother particles but having a fragility index (Fr) as defined herein of 5 or more, at a high speed in an air stream.

2. Microencapsulated particles according to claim 1, wherein the mother particles have a number average particle diameter (Sn) of 1 to 100 μm and such a particle diameter distribution that at least 70% by weight of the mother particles have particle diameters falling within a range of 0.8Sn to 1.2Sn.

3. Microencapsulated particles according to claim 1 or 2, wherein the mother particles are particles obtained by allowing seed particles in an aqueous dispersion to absorb a highly oleophilic substance, then adding a monomer to the dispersion and thereafter polymerizing the monomer.

4. Microencapsulated particles according to claim 1 or 2, wherein the mother particles are fine particles of at least one organic or inorganic substance.

5. Microencapsulated particles according to claim 1 or 2, wherein the mother particles are porous particles having absorbed thereinto or absorbed thereon a liquid substance or a solid substance powder.

6. Microencapsulated particles according to any one of claims 1 to 5, wherein the daughter particles (1) and (2) are mixed particles of at least two types of coating layer-forming materials and at least one of these materials is a thermoplastic resin.

7. Microencapsulated particles according to any one of claims 1 to 6, wherein the coating layer has a multilayer structure consisting of at least two layers.

8. A process for producing microencapsulated particles, which comprises stirring mother particles of a core substance having a number average particle diameter of 1 to 200 μm and either or both of (1) daughter particles of a coating layer-forming material having a number average particle diameter of 1/5 or less of that of the mother particles and (2) fragile daughter particles of a coating layer-forming material having a number average particle diameter of more than 1/5 of that of the mother particles but having a fragility index (Fr) as defined herein of 5 or more, at a high speed in an air stream, thereby forming a coating layer of said daughter particles on each of said mother particles.

9. A process for producing microencapsulated particles according to claim 8, wherein the mother particles have a number average particle diameter (Sn) of 1 to 100 μm and such a particle diameter distribution that at least 70% by weight of the mother particles have particle diameters falling within a range of 0.8Sn to 1.1Sn.

10. A process for producing microencapsulated particles according to claim 8 or 9, wherein the mother particles are particles obtained by allowing seed particles in an aqueous dispersion to absorb a highly oleophilic substance, then adding a monomer to the dispersion and thereafter polymerizing the monomer.

11. A process for producing microencapsulated particles according to claim 8 or 9, wherein the mother particles are fine particles of at least one organic or inorganic substance.

12. A process for producing microencapsulated particles according to claim 8 or 9, wherein the mother particles are porous particles having absorbed thereinto or adsorbed thereon a liquid substance or a solid substance powder.

13. A process for producing microencapsulated particles according to any one of claims 8 to 12 wherein the daughter particles (1) and (2) are mixed particles of at least two types of coating layer-forming materials and at least one of these materials is a thermoplastic resin.

14. A process for producing microencapsulated particles according to any one of claims 8 to 12, wherein the daughter particles (1) and (2) each consist of at least one substance or composition different from that constituting the surfaces of the mother particles.

15. A process for producing microencapsulated particles according to any one of claims 8 to 14, wherein the stirring of the mother particles and either or both of the daughter particles (1) and (2) at at high speed in an air stream is conducted in a container equipped with agitating blades at a blade peripheral speed of at least 15 m/sec.

16. A process for producing microencapsulated particles according to claim 15, wherein the blade peripheral speed is 40 to 150 m/sec.

17. A process for producing microencapsulated particles according to any one of claims 8 to 16, wherein the stirring of the mother particles and either or both of the daughter particles (1) and (2) at a high speed in an air stream is conducted in a container equipped with agitating blades at such a concentration that the total weight of the mother particles and the daughter particles is 10 to 100 g per liter of the internal volume of the container.

18. A process for producing microencapsulated particles according to claim 17, wherein the concentration is 20 to 70 g of the total weight of the mother particles and the daughter particles per liter of the internal volume of the container.

19. A process for producing microencapsulated particles according to any one of claims 8 to 18, wherein the number average particle diameter of the daughter particles (1) is 1/10 or less of that of the mother particles.

20. A toner for electronograph obtained by stirring (a) mother particles consisting of thermoplastic polymer particles having a number average particle diameter of 1 to 30 μm and (b) daughter particles consisting of color pigment particles and thermoplastic polymer particles having a number average particle diameter of 1/10 or less of that of the mother particles at a high speed in an air stream.

21. A toner according to claim 20, wherein the thermoplastic polymer of the mother particles is different in composition from the thermoplastic polymer of the daughter particles.

22. A toner according to claim 20 or 21, wherein the daughter particles consist of a mixture of the thermoplastic resin and a charge-controlling agent.

23. A toner for electronograph obtained by the first step of stirring (a) mother particles consisting of thermoplastic polymer particles having a number average particle diameter of 1 to 30 μm and (b) daughter particles consisting of color pigment particles and thermoplastic polymer particles having a number average particle diameter of 1/10 or less of that of the mother particles, at a high speed in an air stream and the second step of stirring the microencapsulated particles obtained in the first step, which are used as mother particles in the second step, and daughter particles (1) consisting of thermoplastic polymer particles and having a number average particle diameter of 1/10 or less of that of the mother particles, at a high speed in an air stream.

24. A toner according to claim 23, wherein the thermoplastic polymer of the first step is different in composition from the thermoplastic polymer of the mother particles in the first step and the thermoplastic polymer of the daughter particles in the second step.

25. A toner according to claim 23 or 24 wherein the daughter particles in the second step consists of a mixture of the thermoplastic polymers and a charge-controlling agent.

* * * * *